United States Patent
Kim et al.

(10) Patent No.: US 7,867,656 B2
(45) Date of Patent: Jan. 11, 2011

(54) FUEL CELL SEPARATOR AND METHOD FOR MANUFACTURING THE SAME

(75) Inventors: Sae Hoon Kim, Gyeonggi-do (KR); Sung Ho Lee, Gyeonggi-do (KR); Jung Do Suh, Seoul (KR); Byung Ki Ahn, Gyeonggi-do (KR); Tae Won Lim, Seoul (KR); Dai Gil Lee, Daejeon (KR); Seong Su Kim, Gyeongsangnam-do (KR); Ha Na Yu, Gyeongsangbuk-do (KR); In Uk Hwang, Gyeonggi-do (KR)

(73) Assignees: Hyundai Motor Company, Seoul (KR); Korea Advanced Institute of Science and Technology, Daejeon (KR)

(*) Notice: Subject to any disclaimer, the term of this patent is extended or adjusted under 35 U.S.C. 154(b) by 156 days.

(21) Appl. No.: 12/229,183

(22) Filed: Aug. 19, 2008

(65) Prior Publication Data
US 2009/0269671 A1 Oct. 29, 2009

(30) Foreign Application Priority Data
Apr. 25, 2008 (KR) .................. 10-2008-0038460

(51) Int. Cl.
*H01M 2/14* (2006.01)
(52) U.S. Cl. ...................... 429/247; 156/256
(58) Field of Classification Search ............ 429/247
See application file for complete search history.

(56) References Cited

U.S. PATENT DOCUMENTS

| | | | |
|---|---|---|---|
| 2001/0046560 A1* | 11/2001 | Fong et al. ............ | 427/294 |
| 2002/0004158 A1* | 1/2002 | Suzuki et al. .......... | 429/34 |
| 2007/0125493 A1 | 6/2007 | Jang et al. | |
| 2007/0259244 A1* | 11/2007 | Araki et al. ........... | 429/34 |

FOREIGN PATENT DOCUMENTS

| | | |
|---|---|---|
| KR | 10-2004-0016378 | 2/2004 |
| KR | 10-2005-0038030 | 4/2005 |
| KR | 10-2005-0120515 | 12/2005 |
| KR | 10-2007-0084217 | 8/2007 |

* cited by examiner

*Primary Examiner*—Patrick Ryan
*Assistant Examiner*—Brent Thomas
(74) *Attorney, Agent, or Firm*—Edwards Angell Palmer & Dodge LLP; Peter F. Corless

(57) ABSTRACT

The present invention provides a fuel cell separator formed of a continuous carbon-fiber composite, and a method for manufacturing the same.

14 Claims, 3 Drawing Sheets

FIRST STEP: CUTTING    SECOND STEP: STACKING

THIRD STEP:　　　　　FOURTH STEP:
HOT PRESSING　　　　　TRIMMING

FUEL CELL SEPARATOR AND METHOD FOR MANUFACTURING THE SAME

CROSS-REFERENCE TO RELATED APPLICATION

This application claims under 35 U.S.C. §119(a) the benefit of Korean Patent Application No. 10-2008-0038460 filed Apr. 25, 2008, the entire contents of which are incorporated herein by reference.

BACKGROUND (a) Technical Field

The present invention relates to a fuel cell separator and a method for manufacturing the same. More particularly, the present invention relates to a fuel cell separator formed of a continuous carbon-fiber composite, and a method for manufacturing the same.

(b) Background Art

A fuel cell is a device that produces electricity through an electrochemical reaction of hydrogen ($H_2$) and oxygen ($O_2$) and includes a membrane electrode assembly (MEA) having a structure in which a fuel electrode (anode) to which hydrogen is supplied and an air electrode (cathode) to which oxygen in air is supplied are provided with an electrolyte membrane transporting hydrogen ions and that is interposed between the electrodes, and a gas diffusion layer (GDL) that is disposed on the outsides of the electrodes.

Moreover, a separator including flow fields for supplying fuel and discharging water produced by the reaction is stacked on the outside of the GDLs, thus forming a fuel cell stack in which the MEA and the separators are sequentially stacked.

Electrical energy is produced by the electrochemical reaction occurring when a fuel source such as hydrogen, or a mixed gas containing a considerable amount of hydrogen, is supplied to the fuel electrode (hydrogen electrode) on one side and oxygen, or air containing oxygen, is supplied to the air electrode (oxygen electrode) on the other side.

As shown in FIG. 4, a fuel cell separator 30 of a fuel cell stack preferably includes a plurality of manifolds 32, suitably provided at both ends of the fuel cell stack and supplying and discharging hydrogen, air, and coolant, respectively, and a plurality of hydrogen, air, and coolant flow fields 34, provided between the manifolds 32 in the longitudinal direction of the fuel cell stack, each having a fine channel structure.

The above-described fuel cell separator requires various conditions, including, but limited to, a high electrical conductivity, a high chemical resistance, a high mechanical strength, a low thermal mass (related to cold start), and the like.

Among conventional separators, since a graphite separator is formed of a thin graphite plate by a milling machine process, the manufacturing time and cost are increased and the graphite separator may further be damaged by impact.

An expansion carbon separator is difficult to form a fine channel through which a fluid flows, and the electrical conductivity is lower than that of the graphite separator.

A composite separator formed of a mixture of graphite powder and a polymer binder has difficulty in forming the fine channel for the flow of the fluid, and the electrical conductivity is lower than that of the graphite separator.

Korean Patent Application No. 10-2007-0060189 discloses a separator and a method for manufacturing the same, the method comprising mixing 75 to 85 wt % of graphite having a particle size of 10 to 200 μm, 13.5 to 22.5 wt % of phenol resin, and 1.5 to 2.5 wt % of a curing agent to prepare a composite material, dispersing the thus prepared composite material into a mold to be molded into a separator, and heat-treating the thus molded separator at a temperature of 100 to 120° C. The separator manufactured by this method is characterized by low mechanical strength and low electrical conductivity. Further, the moldability is decreased since the process of compressing the powder material in the mold is complicated. Moreover, since the time to perform the heat treatment process is substantial, the mass productivity is low.

Japanese Patent Publication No. 1999-297338 discloses a separator for a solid polymer type fuel cell using carbon/graphite powder and a polymer binder, and a manufacturing method of the same. However, the moldability of the separator described by the 1999-297338 publication is deteriorated since the process of compressing the powder material in the mold is complicated, and the mass productivity is low since the time it takes to perform the heat treatment process is substantial.

Japanese Patent Publication No. 2001-325967 discloses a manufacturing method of a fuel cell separator using a conductive powder having a grain size of 60 to 100 μm, a binder and a volatile solvent, a fuel cell separator, and a solid polymer type fuel cell. The electrical characteristics are improved when the grain content becomes high and thus the contact between the grains is increased; however if the grain content is high, the mechanical properties are decreased, and thus the moldability is decreased. Moreover, the method using the volatile solvent increases processing time, reduces work safety, and causes environmental problems.

The above information disclosed in this Background section is only for enhancement of understanding of the background of the invention and therefore it may contain information that does not form the prior art that is already known in this country to a person of ordinary skill in the art.

SUMMARY

In one aspect, the present invention provides a fuel cell separator manufactured using a substantially continuous carbon-fiber composite, in which carbon fibers are substantially surrounded by a polymer binder, by a continuous process for mass production, and a method for manufacturing the same.

In one embodiment, the present invention as described herein provides a method for manufacturing a fuel cell separator, the method comprising: a first step of providing a raw material of a substantially continuous carbon-fiber composite in a semi-cured state i.e. prepreg or SMC; a second step of cutting the raw material to preferably have the length and shape of the separator; a third step of stacking and adhering a single or a plurality of the raw materials cut according to the length of the separator; a fourth step of disposing the raw material, stacked in a single or multi-layer, on a high temperature hot press to be heated and pressed; a fifth step of removing unnecessary portions from the heated and pressed separator; and a sixth step of post-curing the thus obtained separator.

In a preferred embodiment, the continuous carbon-fiber composite is a substantially continuous fiber having a length of several meters or more with a preferred structure in which carbon fibers are substantially closely packed and bound by a thermosetting polymer binder as to have substantially direct contacts among fibers offering good electrical conductivity across the fibers.

In another preferred embodiment, a conductive powder such as, but not limited to, carbon black for improving electrical conductivity is further mixed with the polymer binder.

In still another preferred embodiment, in the second step, the raw material is preferably passed through a cutting roller equipped with cutters such that the raw material is cut according to the length of the separator and, at the same time, manifolds for fluids such as hydrogen, air, or coolant and assembly holes are suitably formed on the raw material.

In yet another preferred embodiment, in the third step, a single or a plurality of the raw materials suitably cut according to the length of the separator is passed through a stacking/compression roller to be heated and pressed, in which the plurality layers of the raw material are stacked in pre-defined stacking sequences including a zigzag manner, for example, of 0°, 90°, and 0° to be adhered to each other by applying pressure and heat up to the dwelling temperature of its polymer binder.

In still yet another preferred embodiment, in the fourth step, hydrogen, air, and coolant flow fields are suitably formed on the raw material by positive and negative flow field patterns formed on upper and lower platens of the high temperature hot press.

In a further preferred embodiment, the fifth step of removing unnecessary portions from the separator is performed within a minimum period of time so that the heated and pressed separator has a curing degree that can maintain its shape.

In another further preferred embodiment, in the sixth step, at least 600, 500, 400, 300, 200, 100, separators are placed in an autoclave at a time to be post-cured at a predetermined temperature for a predetermined time so that the separators are finally cured.

In another embodiment, the present invention provides a method for manufacturing a fuel cell separator, the method comprising: a first step of providing a raw material of a suitably continuous carbon-fiber composite in a semi-cured state; a second step of forming the raw material to have the length and shape of the separator; a third step of stacking and adhering a single or a plurality of the raw materials preferably cut according to the length of the separator; a fourth step of disposing the raw material, suitably stacked in a single or multi-layer, on a high temperature hot roller to be press-molded, heated, and partially cured; a fifth step of removing unnecessary portions from the heated and pressed-molded separator; and a sixth step of post-curing the thus obtained separator.

In a preferred embodiment, in the fourth step, hydrogen, air, and coolant flow fields are suitably formed on the raw material by positive and negative flow field patterns formed on the surface of the high temperature hot roller.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

Figure 1:
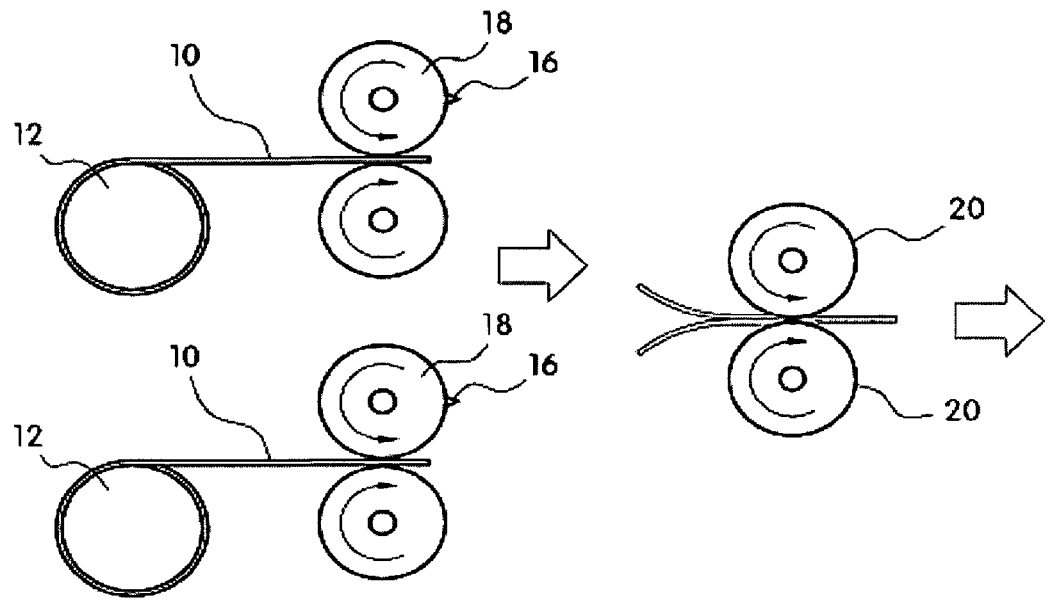
FIG. 1 is a flow diagram illustrating a method for manufacturing a fuel cell separator in accordance with a first embodiment of the present invention.
Figure 1:
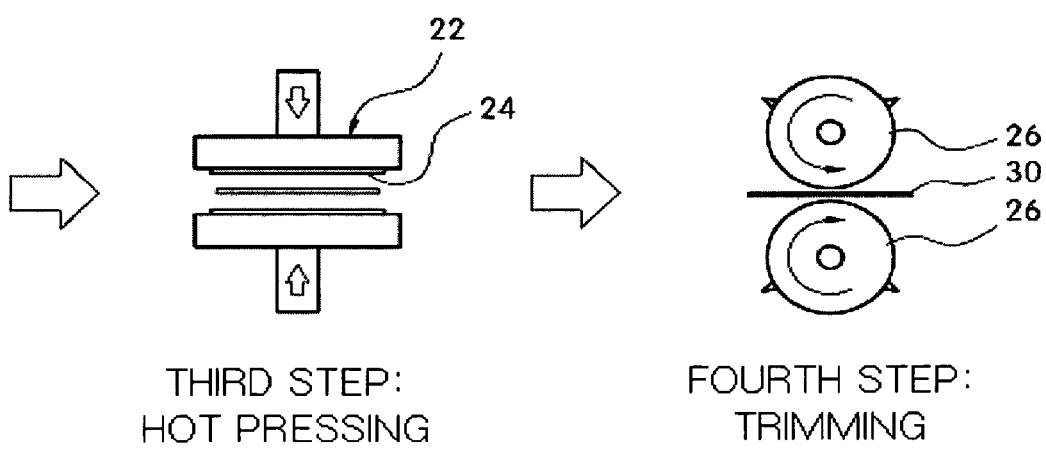

Reference numerals set forth in the Drawings includes reference to the following elements as further discussed below:

10: raw material of continuous carbon-fiber composite
12: roll
16: cutter
18: cutting roller
20: stacking/compression roller
22: high temperature hot press
24: positive and negative flow field patterns
26: trim cutter
28: hot roller
30: separator
32: manifold
34: flow field It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes a method for manufacturing a fuel cell separator, the method comprising a first step of providing a raw material of a continuous carbon-fiber composite in a semi-cured state; forming the raw material to have the length and shape of the separator; stacking and adhering a single or a plurality of the raw materials cut according to the length of the separator; disposing the raw material, stacked in a single or multi-layer, on a high temperature hot press to be heated and pressed; and removing unnecessary portions from the heated and pressed separator.

In certain embodiments of the invention, the method further comprises post-curing the thus obtained separator.

The invention can also include a motor vehicle comprising a fuel cell separator as described herein.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
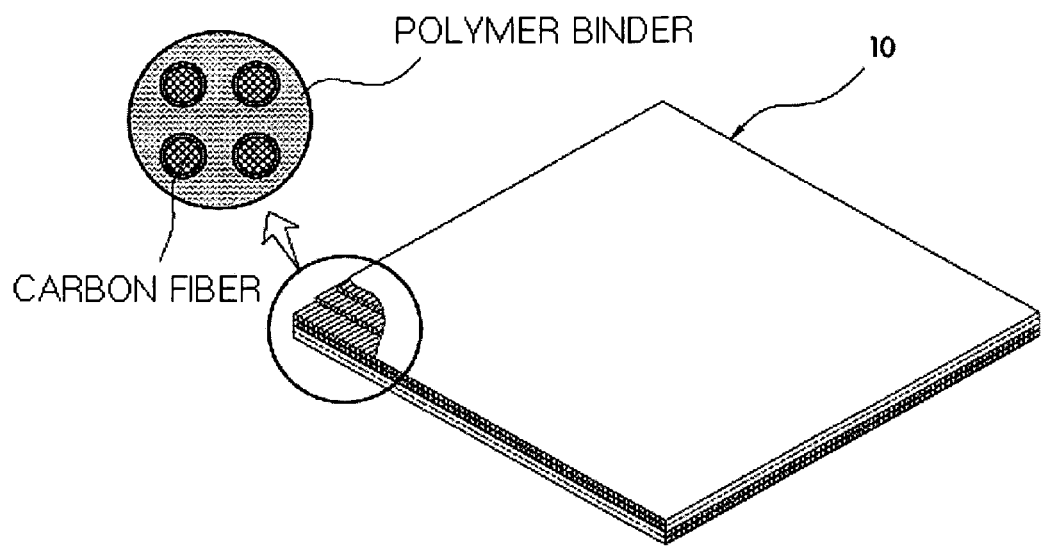
FIG. 3 is a schematic diagram illustrating a structure of a continuous carbon-fiber composite.
Figure 4:
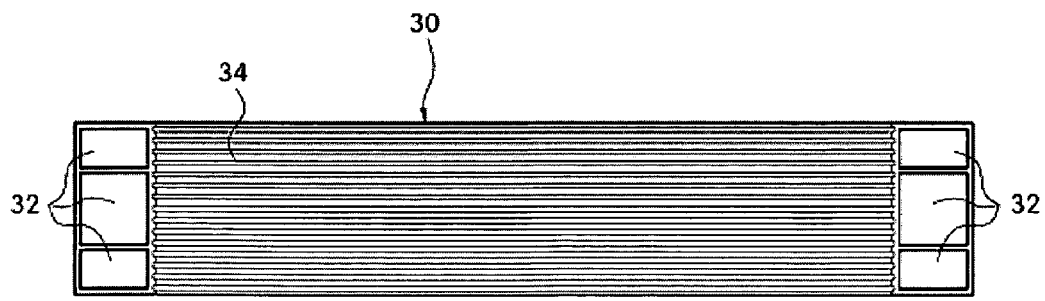
FIG. 4 is a schematic diagram illustrating a structure of a fuel cell separator.

As shown in exemplary FIG. 3, a fuel cell separator in accordance with the present invention has a characteristic feature in that it can be manufactured by a substantially continuous process for mass production preferably using a continuous carbon-fiber composite having a preferred structure in which carbon fibers are surrounded by a polymer binder.

In certain embodiments of the invention, a conductive powder such as, but not limited to, carbon black is further mixed with the polymer binder of the continuous carbon-fiber composite in order to improve electrical conductivity.

Property values of the continuous carbon-fiber composite used in manufacturing the separator of the present invention and those of conventional materials such as graphite, carbon powder composite, metal (stainless steel: SUS) are compared as shown in the following table 1:

(6) the continuous carbon-fiber composite has the flexural strength higher than that of other materials, thus it is possible to prevent damage due to stress in the event that deformation occurs due to clamping load; and (7) The compressive strength and the corrosion resistance of the continuous carbon-fiber composite are satisfied with the standards.

Accordingly, it is known that the continuous carbon-fiber composite preferably used in manufacturing the separator of the present invention has excellent properties compared with the conventional materials (e.g. graphite, carbon-powder, and chopped-carbon fiber composite). The mechanical strength of the continuous carbon-fiber composite is excellent, thus it is possible to minimize the deformation due to the clamping force applied to the fuel cell stack, thus suitably improving sealing properties. Furthermore, since the impact strength of

TABLE 1

| Properties | Graphite (Conventional) | Carbon powder Composite (Conventional) | Metal: SUS (Conventional) | Carbon-fiber Reinforced Composite (Invention) | DOE Standard |
|---|---|---|---|---|---|
| Specific gravity ($g/cm^3$) | 1.88 | 1.92 | 7.87 | 1.9 | N/A |
| Thermal conductivity (Raw material, W/mK) | 100 | 0.8 to 20 | 16.3 | 48.4 to 60.6 | 40 |
| Contact Resistance (@150 psig, $m\Omega cm^2$) | 15.6 | 20.2 | 75 | 20 to 30 | 25 |
| Thermal expansion coefficient ($10^{-6}$/K) | 4.7 | 10 to 30 | 11 to 18 | −0.12 to 22 | N/A |
| Electrical Conductivity (S/Cm) | 770 | 251 | 13889 | 100 to 125 | Over 100 |
| Flexural Strength (MPa) | 85 | 50 | 510 | 1550 | Over 34 MPa |
| Compressive strength (MPa) | 170 | Satisfied | Satisfied | Satisfied | Over 105 MPa |
| Corrosion resistance | Satisfied | Satisfied | Expensive coating required | Satisfied | Over 1 $mA/cm^2$ |
| Processing method | Machining | Pressing | Pressing | Hot pressing, Vacuum bag molding | N/A |

As shown in Table 1, was and as confirmed through experimentation using commonly available equipment, continuous carbon-fiber composite in accordance with the present invention has the following advantages:

(1) continuous carbon-fiber composite has a specific gravity of about one-quarter that of the metal material (SUS), and thus it can contribute to light weight;

(2) thermal conductivity of continuous carbon-fiber composite is lower than that of the graphite, thus it is possible to reduce the thickness of the overall separator, and thus the reaction area per unit volume is increased, which results in a suitable increase in power density;

(3) the contact resistance of the continuous carbon-fiber composite is low, thus the current loss in the fuel cell stack is suitably reduced, and thus it is possible to increase the efficiency of the fuel cell;

(4) It is possible to adjust the thermal expansion coefficient in the range from negative to positive according to stacking angles, and thus dimensional stability is excellent;

(5) the absolute value of the continuous carbon-fiber composite electrical conductivity is lower than that of the graphite, however the continuous carbon-fiber composite can be formed thinner than the graphite, and thus the actual bulk resistance can be suitably realized at an equivalent value;

the continuous carbon-fiber composite is excellent, the continuous carbon-fiber composite is not easily broken by impact compared with the graphite material such that the handling is easy and there is no concern of damage due to load.

The continuous carbon-fiber composite has a low gas permeability and, especially, according to preferred embodiments, the continuous process for mass production can be applied, differently from the conventional power-based composite that is molded into a separator using a mold.

In exemplary embodiments of the invention as described herein, since the continuous carbon-fiber composite has a specific heat lower than that of other materials used in the conventional separators, the thermal inertia is low, which is advantageous for the cold start. In addition, since the continuous carbon-fiber composite has excellent chemical resistance, coating is not required, and thus it is possible to significantly reduce the manufacturing cost.

Accordingly, the separator in accordance with the present invention can be manufactured by the continuous process for mass production.

Hereinafter, preferred embodiments of the present invention will be described below; however, the present invention is not limited to the following embodiments.

First Embodiment

A method for manufacturing a separator in accordance with a first preferred embodiment of the present invention preferably provides a method of molding a continuous carbon-fiber composite by a hot pressing process.

FIG. 1 is a flow diagram illustrating the method for manufacturing a fuel cell separator in accordance with one preferred embodiment of the present invention.

A preferred raw material 10 of a continuous carbon-fiber composite, which is a continuous fiber having a preferred length of several meters or more with a structure in which carbon fibers having a preferred diameter of about 10 μm are suitably surrounded by a thermosetting polymer binder, is wound on a roll 12.

According to preferred embodiments, the raw material 10 of the continuous carbon-fiber composite is provided as a prepreg, suitably in the form of a semi-cured sheet or as a sheet molding compound (SMC) in a semi-cured state.

According to further embodiments, the raw material 10 of the continuous carbon-fiber composite is passed through a plurality of cutting rollers 18 in the form of a long roll preferably including a cutter 16 provided on the surface thereof such that the raw material 10 is cut according to the length of a separator and, at the same time, a common distribution manifold and an assembly hole are suitably formed on the raw material 10.

In further embodiments, a plurality of raw materials 10, i.e., a single raw material 10 cut according to the length of the separator is preferably continuously passed through a stacking/compression roller 20 or a plurality of raw materials 10 cut according to the length of the separator is arranged in a zigzag manner such as 0°/90°/0° and then passed through the stacking/compression roller 20.

Accordingly, if the thickness of the raw material 10 is 0.1 mm, preferably three to five raw materials 10 cut according to the length of the separator are suitably arranged in a zigzag manner in consideration of the thickness of the separator to be manufactured.

in further embodiments, the stacking/compression roller 20 is suitably equipped with a separate heating means and, accordingly, when the raw materials 10 are preferably passed through the stacking/compression roller 20, they are pressed closely against each other at a temperature of 40 to 80° C.

Preferably, if the raw materials 10 are pressed at a temperature below 40° C., the adhesive strength between the raw materials 10 is suitably decreased, whereas, if the raw materials 10 are pressed at a temperature over 80° C., they may be suitably cured. Accordingly, in certain embodiments it is preferable that the raw materials 10 are pressed at a temperature of 40 to 80° C.

In further embodiments, the raw material 10 preferably stacked in a single or multi-layer is placed on a high temperature hot press 22 to be press-molded.

Accordingly, it is preferable that the molding temperature of the high temperature hot press 22 with respect to the raw materials 10 is suitably maintained at a temperature of 150 to 550° C. If the molding temperature is below 150° C., the moldability is suitably deteriorated, whereas, if it is over 550° C., the raw material 10 may be cured.

In certain preferred embodiments, positive and negative flow field patterns 24 for forming hydrogen, air, and coolant flow fields are provided on upper and lower platens of the high temperature hot press 22. Accordingly, the hydrogen, air, and coolant flow fields are suitably formed on the raw material 10 by the press molding of the high temperature hot press 22.

In further embodiments, the heated and press-molded raw material 10 is subjected to a finishing process of removing unnecessary portions from the separator using a trim cutter 26. The finishing process is preferably performed within a minimum period of time so that the heated and press-molded raw material 10 has a curing degree that can maintain its shape.

In further embodiments of the invention, a post-curing process, in which about, but not limited to only, 400 separators are placed in an autoclave at a suitable time to be heat-treated at about 125° C. for about 2 hours, is performed so that the separators are finally cured.

Second Embodiment

A method for manufacturing a separator in accordance with a second embodiment of the present invention provides a method of molding a continuous carbon-fiber composite by a hot rolling process.

Figure 2:
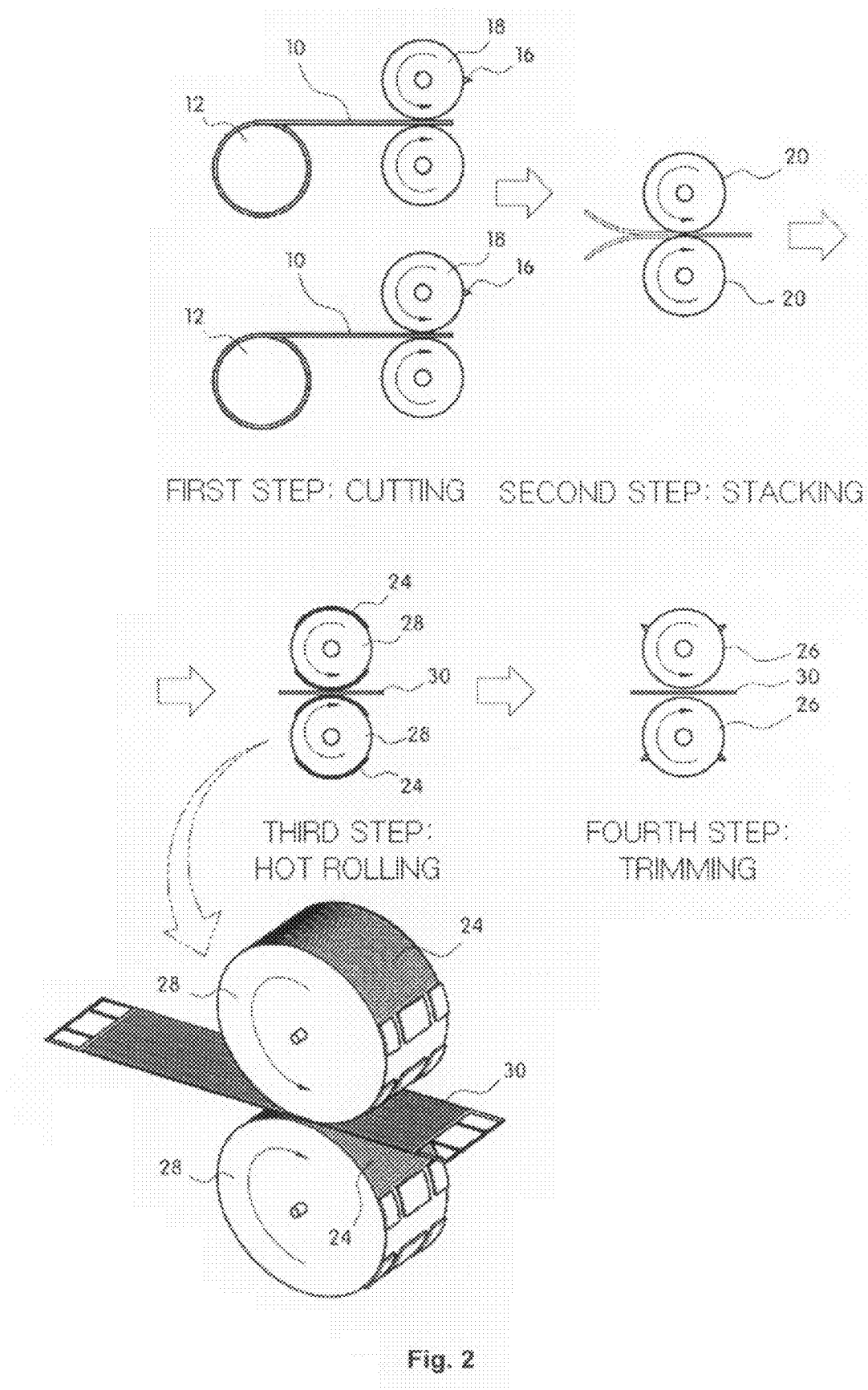
FIG. 2 is a flow diagram illustrating a method for manufacturing a fuel cell separator in accordance with a second embodiment of the present invention.

FIG. 2 is a flow diagram illustrating the method for manufacturing a fuel cell separator in accordance with another preferred embodiment of the present invention.

A raw material 10 of a continuous carbon-fiber composite, which is preferably a continuous fiber having a length of several meters or more with a structure in which carbon fibers having a diameter of about 10 μm are surrounded by a thermosetting polymer binder, is wound on a roll 12.

Accordingly, the raw material 10 of the continuous carbon-fiber composite is preferably provided as a prepreg in the form of a semi-cured sheet or as a sheet molding compound (SMC) in a semi-cured state.

In another embodiment, as described herein, the raw material 10 of the continuous carbon-fiber composite is preferably passed through a plurality of cutting rollers 18, suitably in the form of a long roll including a cutter 16 provided on the surface thereof such that the raw material 10 is cut according to the length of a separator and, at the same time, a common distribution manifold and an assembly hole are suitably formed on the raw material 10.

Accordingly, as described herein, a plurality of raw materials 10, i.e., a single raw material 10 preferably cut according to the length of the separator is continuously passed through a stacking/compression roller 20 or a plurality of raw materials 10 cut according to the length of the separator is preferably arranged in a zigzag manner such as 0°/90°/0° and then passed through the stacking/compression roller 20.

Accordingly, if the thickness of the raw material 10 is 0.1 mm, three to five raw materials 10 cut according to the length of the separator are suitably arranged in a zigzag manner in consideration of the thickness of the separator to be manufactured.

According to other embodiments, the stacking/compression roller 20 is preferably equipped with a separate heating means and, accordingly, when the raw materials 10 are suitably passed through the stacking/compression roller 20, they are pressed closely against each other at a temperature of 40 to 80° C.

In other preferred embodiments, if the raw materials 10 are pressed at a temperature below 40° C., the adhesive strength between the raw materials 10 is suitably decreased, whereas, if the raw materials 10 are pressed at a temperature over 80° C., they may be suitably cured. Accordingly, it is preferable in certain embodiments that the raw materials 10 are pressed at a temperature of 40 to 80° C.

Then, the raw material 10 stacked in a single or multi-layer is placed on a high temperature hot roller 28 to be press-molded, heated, and partially cured.

According to other embodiments, positive and negative flow field patterns 24 for forming hydrogen, air, and coolant flow fields are preferably provided on the surface of the high temperature hot roller 28. Accordingly, the hydrogen, air, and coolant flow fields are suitably formed on the raw material 10 as the raw material 10 is passed through the high temperature hot roller 28 and press-molded.

Preferably, the heating temperature of the high temperature hot roller 28 with respect to the raw materials 10 is suitably maintained at a temperature of 150 to 250° C. If the heating temperature is below 150° C., the moldability is suitably deteriorated, whereas, if it is over 250° C., the raw material 10 may be cured.

In other further embodiments, the press-molded raw material 10 is subjected to a finishing process of removing unnecessary portions from the separator preferably using a trim cutter 26.

In further embodiments, a post-curing process, in which about, but not limited to, 400 separators are placed in an autoclave at a time to be heat-treated at about 125° C. for about 2 hours, is performed so that the separators are finally cured.

It is possible to easily manufacture the separator preferably using the continuous carbon-fiber composite by the hot pressing or hot rolling process, which is the continuous process for mass production, differently from the conventional method in which the power-based composite is molded using a mold.

As described above, the present invention provides the following effects.

It is possible to easily manufacture the separator using the continuous carbon-fiber composite, in which the hot press or hot roller having the positive or negative flow field patters is preferably used to form the hydrogen, air, and coolant flow fields on the separator. In preferred embodiments, the separator manufactured by the present invention has excellent impact strength, moldability, and chemical resistance and, in preferred embodiments, exhibits very excellent flexural strength, compared with the conventional separators formed of other materials.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a fuel cell separator, the method comprising:
   a first step of providing a raw material of a composite comprising continuous carbon-fiber in a semi-cured state;
   a second step of forming the raw material to have the length and shape of the separator;
   a third step of stacking and adhering a single or a plurality of the raw materials cut according to the length of the separator;
   a fourth step of disposing the raw material, stacked in a single or multi-layer, on a high temperature hot press to be heated and pressed;
   a fifth step of removing unnecessary portions from the heated and pressed separator; and
   a sixth step of post-curing the thus obtained separator,
   wherein the composite comprising continuous carbon-fiber is a continuous fiber having a length of several meters or more with a structure in which a carbon fiber is surrounded by a thermosetting polymer binder.

2. A method for manufacturing a fuel cell separator, the method comprising:
   a first step of providing a raw material of a composite comprising continuous carbon-fiber in a semi-cured state;
   a second step of forming the raw material to have the length and shape of the separator;
   a third step of stacking and adhering a single or a plurality of the raw materials cut according to the length of the separator;
   a fourth step of disposing the raw material, stacked in a single or multi-layer, on a high temperature hot roller to be press-molded, heated, and partially cured;
   a fifth step of removing unnecessary portions from the heated and pressed-molded separator; and
   a sixth step of post-curing the thus obtained separator,
   wherein the composite comprising continuous carbon-fiber is a continuous fiber having a length of several meters or more with a structure in which a carbon fiber is surrounded by a thermosetting polymer binder.

3. The method of claim 1, wherein a conductive powder for improving electrical conductivity is further mixed with the polymer binder.

4. The method of claim 3, wherein the conductive powder is carbon black.

5. The method of claim 1, wherein, in the second step, the raw material is passed through a cutting roller equipped with a cutter such that the raw material is cut according to the length of the separator and, at the same time, a common distribution manifold and an assembly hole are formed on the raw material.

6. The method of claim 1, wherein, in the third step, a single or a plurality of the raw materials cut according to the length of the separator is passed through a stacking/compression roller to be heated and pressed, in which the plurality of raw materials is arranged in a zigzag manner of 0°, 90°, and 0° to be adhered to each other by applying heat and pressure.

7. The method of claim 1, wherein, in the fourth step, hydrogen, air, and coolant flow fields are formed on the raw material by positive and negative flow field patterns formed on upper and lower platens of the high temperature hot press.

8. The method of claim 1, wherein the fifth step of removing unnecessary portions from the separator is performed within a minimum period of time so that the heated and pressed separator has a curing degree that can maintain its shape.

9. The method of claim 1, wherein, in the sixth step, at least 400 separators are placed in an autoclave at a time to be post-cured at a predetermined temperature for a predetermined time so that the separators are finally cured.

10. The method of claim 2, wherein, in the fourth step, hydrogen, air, and coolant flow fields are formed on the raw material by positive and negative flow field patterns formed on the surface of the high temperature hot roller.

11. A fuel cell separator made of a composite comprising continuous carbon-fiber, in which continuous carbon-fiber has a length of several meters or more, and the continuous carbon-fiber is surrounded by a thermosetting polymer binder.

12. A method for manufacturing a fuel cell separator, the method comprising:
   providing a raw material of a composite comprising continuous carbon-fiber in a semi-cured state;
   forming the raw material to have the length and shape of the separator;

stacking and adhering a single or a plurality of the raw materials cut according to the length of the separator;

disposing the raw material, stacked in a single or multi-layer, on a high temperature hot press to be heated and pressed; and removing unnecessary portions from the heated and pressed separator, wherein the composite comprising continuous carbon-fiber is a continuous fiber having a length of several meters or more with a structure in which a carbon fiber is surrounded by a thermosetting polymer binder.

13. The method for manufacturing a fuel cell separator of claim 12, further comprising post-curing the thus obtained separator.

14. A motor vehicle comprising the fuel cell separator of claim 11.

* * * * *